(12) United States Patent
Katkoori et al.

(10) Patent No.: US 11,809,563 B2
(45) Date of Patent: Nov. 7, 2023

(54) SYSTEM AND METHOD FOR PROTECTING AGAINST CONTROL-FLOW ATTACKS

(71) Applicant: University of South Florida, Tampa, FL (US)

(72) Inventors: Srinivas Katkoori, Wesley Chapel, FL (US); Sheikh Ariful Islam, Brownsville, TX (US)

(73) Assignee: University of South Florida, Tampa, FL (US)

( * ) Notice: Subject to any disclaimer, the term of this patent is extended or adjusted under 35 U.S.C. 154(b) by 134 days.

(21) Appl. No.: 17/369,045

(22) Filed: Jul. 7, 2021

(65) Prior Publication Data

US 2023/0020547 A1 Jan. 19, 2023

(51) Int. Cl.
 *G06F 21/56* (2013.01)
 *G06F 21/52* (2013.01)
(52) U.S. Cl.
 CPC ............ *G06F 21/566* (2013.01); *G06F 21/52* (2013.01); *G06F 2221/034* (2013.01)
(58) Field of Classification Search
 CPC ........ G06F 21/566; G06F 21/62; G06F 21/52; G06F 2221/034
 See application file for complete search history.

(56) References Cited

U.S. PATENT DOCUMENTS

| | | | | |
|---|---|---|---|---|
| 10,133,965 | B2* | 11/2018 | Wustlich | G06F 18/29 |
| 2012/0286821 | A1* | 11/2012 | Hooi | G06F 30/34 |
| | | | | 326/38 |
| 2017/0124322 | A1* | 5/2017 | Guilley | G06F 21/566 |
| 2021/0406137 | A1* | 12/2021 | Sutherland | G06F 21/51 |

OTHER PUBLICATIONS

M. Abadi et al. Control-flow integrity principles, implementations, and applications. ACM Trans. Inf. Syst. Secur., 13(1), Nov. 2009.
J. L. Greathouse et al. Testudo: Heavyweight security analysis via statistical sampling. In IEEE/ACM International Symposium on Microarchitecture, MICRO 41, p. 117-128, USA, 2008. IEEE Computer Society.
C. Zhang et al. Practical control flow integrity and randomization for binary executables. In 2013 IEEE Symposium on Security and Privacy, pp. 559-573, May 2013.
N. Carlini and D. Wagner. Rop is still dangerous: Breaking modern defenses. In Proceedings of the 23rd USENIX Conference on Security Symposium, SEC'14, p. 385-399, USA, 2014. USENIX Association.

(Continued)

*Primary Examiner* — Ashokkumar B Patel
*Assistant Examiner* — William B Jones
(74) *Attorney, Agent, or Firm* — Meunier Carlin & Curfman LLC

(57) ABSTRACT

A system and method of protecting against control-flow attacks provides two complementary, transparent, and strong security policies for the RTL design at a hardware level. The approach performs static analysis of controller, followed by lightweight instrumentation, such that CFI is enforced in-place and at runtime. The modified controller follows conservative CFG with the help of a monitor.

14 Claims, 12 Drawing Sheets

(56) References Cited

OTHER PUBLICATIONS

F. Schuster et al. Counterfeit object-oriented programming: On the difficulty of preventing code reuse attacks in c++ applications. In 2015 IEEE Symposium on Security and Privacy, pp. 745-762, May 2015.
R. de Clercq and I. Verbauwhede. A survey of hardware-based control flow integrity (CFI). arXiv preprint arXiv:1706.07257, 2017.
D. Sullivan et al. Strategy without tactics: Policy-agnostic hardware enhanced control-flow integrity. In 2016 53nd ACM/EDAC/IEEE Design Automation Conference (DAC), pp. 1-6, Jun. 2016.
L. Davi et al. Hafix: Hardware-assisted flow integrity extension. In 2015 52nd ACM/EDAC/IEEE Design Automation Conference (DAC), pp. 1-6, Jun. 2015.
V. Mohan et al. Opaque Control-Flow Integrity. In NDSS, vol. 26, pp. 27-30, 2015.
D. Arora et al. Hardware-assisted run-time monitoring for secure program execution on embedded processors. IEEE Transactions on Very Large Scale Integration (VLSI) Systems, 14(12):1295-1308, Dec. 2006.
S. Das, W. Zhang, and Y. Liu. A fine-grained control flow integrity approach against runtime memory attacks for embedded systems. IEEE TVLSI Systems, 24(11):3193-3207, Nov. 2016.
M. Kayaalp et al. Efficiently securing systems from code reuse attacks. IEEE Transactions on Computers, 63(5):1144-1156, May 2014.
R. de. Clercq et al. Sofia: Software and control flow integrity architecture. In 2016 Design, Automation Test in Europe Conference Exhibition (DATE), pp. 1172-1177, Mar. 2016.
Y. Cheng et al. Ropecker: A generic and practical approach for defending against rop attacks. In In Symposium on Network and Distributed System Security (NDSS), 2014.
Y. Xia et al. Cfimon: Detecting violation of control flow integrity using performance counters. In IEEE/IFIP International Conference on Dependable Systems and Networks (DSN 2012), pp. 1-12, Jun. 2012.
P. Yuan, Q. Zeng, and X. Ding. Hardware-assisted fine-grained code-reuse attack detection. In Proceedings of the 18th International Symposium on Research in Attacks, Intrusions, and Defenses—vol. 9404, RAID 2015, p. 66-85, Berlin, Heidelberg, 2015. Springer-Verlag.
A. J. Mashtizadeh et al. Ccfi: Cryptographically enforced control flow integrity. In ACM SIGSAC Conference on Computer and Communications Security, CCS '15, p. 941-951, New York, NY, USA, 2015.
L. Davi et al. Stitching the gadgets: On the ineffectiveness of coarse-grained control-flow integrity protection. In Proceedings of the 23rd USENIX Conference on Security Symposium, p. 401-416. USENIX Association, 2014.
N. Burow et al. Control-flow integrity: Precision, security, and performance. ACM Comput. Surv., 50(1), Apr. 2017.
W. He et al. No-jump-into-basic-block: Enforce basic block cfi on the fly for real-world binaries. In 2017 54th ACM/EDAC/IEEE Design Automation Conference (DAC), pp. 1-6, Jun. 2017.
L. Davi, P. Koeberl, and A. Sadeghi. Hardware-assisted finegrained control-flow integrity: Towards efficient protection of embedded systems against software exploitation. In 2014 51st ACM/EDAC/IEEE Design Automation Conference (DAC), pp. 1-6, Jun. 2014.
N. Christoulakis et al. Hcfi: Hardware-enforced control-flow integrity. In ACM Conference on Data and Application Security and Privacy, CODASPY '16, p. 38-49, New York, NY, USA, 2016.
E. Göktas et al. Out of control: Overcoming control-flow integrity. In 2014 IEEE Symposium on Security and Privacy, pp. 575-589, May 2014.
C. Mead and L. Conway. Introduction to VLSI Systems. Addison-Wesley Longman Publishing Co., Inc., Boston, MA, USA, 1979.
C. Gopalakrishnan and S. Katkoori. Behavioral synthesis of datapaths with low leakage power. In 2002 IEEE International Symposium on Circuits and Systems. Proceedings (Cat. No.02CH37353), vol. 4, pp. IV-IV, 2002.

* cited by examiner

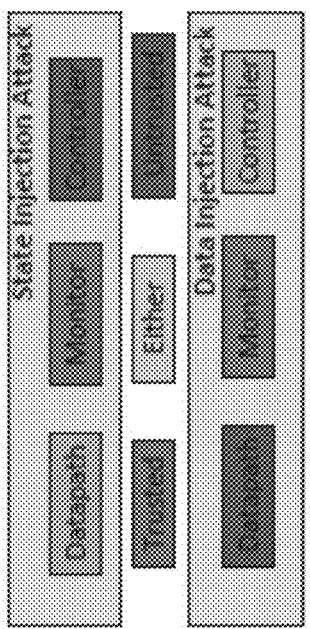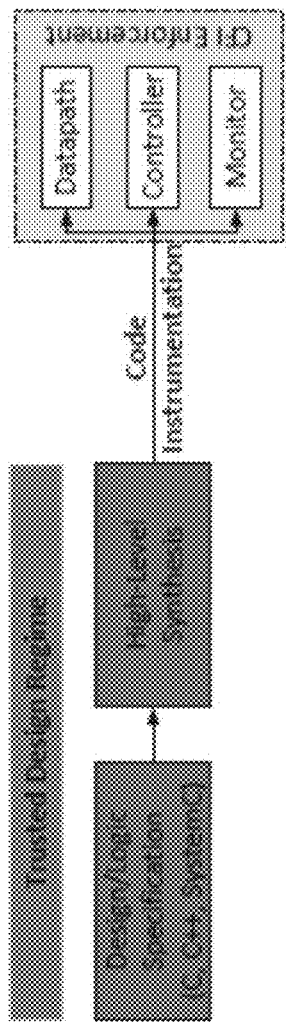
FIG. 4

| PS \ NS | HG | HY | FG | FY |
|---|---|---|---|---|
| HG | 1 | 1 | 0 | 0 |
| HY | 0 | 1 | 1 | 0 |
| FG | 0 | 0 | 1 | 1 |
| FY | 1 | 0 | 0 | 1 |

FIG. 6(c)

Valid Transitions $_{DNF}$ =
(HG*HY*FG) + (HY*FG*FY) + (HG*FG*FY') 
+ (HG'*HY*FY) + (HG*HY'*FY') + 
(HG'*FG'*FY) + (HG'*HY'*FG') + 
(HY'*FG'*FY')

TABLE III: Design attributes of monitor only for three design corners

| Design | A(um²) | Worst-case | | Best-case | | Typical-case | |
|---|---|---|---|---|---|---|---|
| | | P(uW) | D(ns) | P(uW) | D(ns) | P(uW) | D(ns) |
| DCT | 595.46 | 4.46 | 0.73 | 16.74 | 0.11 | 10.66 | 0.19 |
| Decomp | 708.60 | 5.06 | 0.73 | 18.67 | 0.11 | 11.87 | 0.19 |
| Eliptic | 718.65 | 5.18 | 0.73 | 19.39 | 0.11 | 12.28 | 0.19 |
| FIR/FFT | 317.42 | 2.31 | 0.73 | 10.04 | 0.11 | 5.86 | 0.19 |
| Lattice | 575.66 | 4.38 | 0.73 | 16.46 | 0.11 | 10.38 | 0.19 |
| TLC | 758.89 | 8.65 | 0.73 | 37.30 | 0.11 | 22.60 | 0.19 |

* A : Area; D: Delay; P: Power

FIG. 10

TABLE II: Design overhead due to verifier (monitor) and prover (instrumented controller) for three design corners

| Design | Worst-case | | | Best-case | | | Typical-case | | |
|---|---|---|---|---|---|---|---|---|---|
| | A(%) | P(%) | D(%) | A(%) | P(%) | D(%) | A(%) | P(%) | D(%) |
| DCT | 0.43 | 3.31 | 1.62 | 0.30 | 3.39 | 0.13 | 0.03 | 3.27 | 0.34 |
| Decomp | 7.19 | 2.94 | 1.38 | 7.42 | 7.86 | 0 | 7.41 | 7.16 | 1.01 |
| Eliptic | 2.58 | 3.39 | 3.93 | 1.89 | 4.4 | 3.08 | 2.09 | 4.37 | 3.23 |
| FFT | 0.83 | 2.94 | 4.58 | 0.08 | 3.57 | 4.2 | 1.34 | 3.23 | 4.58 |
| FIR | 0.71 | 3.08 | 1.8 | 0.93 | 3.83 | 0.48 | 0.54 | 3.74 | 0.81 |
| Lattice | 1.42 | 3.13 | 4.15 | 2.80 | 4.99 | 2.88 | 0.14 | 4.79 | 3.35 |
| TLC | 6.03 | 3.78 | 0.92 | 6.79 | 5.23 | 0.2 | 6.72 | 4.75 | 0.48 |
| Average | 2.73 | 4.23 | 1.79 | 2.90 | 5.08 | 1.32 | 2.61 | 4.75 | 1.60 |

* A : Area; D: Delay; P: Power

FIG. 11

```
1  entity TLC_dp is
2    port ( C: in bit; TL: in bit; TS: in bit;
3           ST: out bit; HL: out bit_vector (1 downto 0);
4           ctrl: in std_logic_vector(31 downto 0);
5           flags: out std_logic_vector(7 downto 0);
6           clear: in std_logic; clock: in std_logic);
7  end TLC_dp;
8
9  architecture TLC of TLC_dp is
10   -- component description
11   begin
12   -- component instantiation
13 end TLC;
```

```
1  entity TLC_dp is
2    port ( C: in bit; TL: in bit; TS: in bit;
3           ST: out bit; HL: out bit_vector (1 downto 0);
4           ctrl: in std_logic_vector(31 downto 0);
5           flags: out std_logic_vector(7 downto 0);
6           clear: in std_logic; clock: in std_logic;
7           alarm_dp: in std_logic);  -- input from controller
8  );
9  begin
10   assert (alarm_dp = '1')
11   report "CFI violation" severity failure;
12 end TLC_dp;
13
14 architecture TLC of TLC_dp is
15   -- component description
16   begin
17   -- component instantiation
18 end TLC;
```

Passive process; always-on and checks status signal from controller

FIG. 13

SYSTEM AND METHOD FOR PROTECTING AGAINST CONTROL-FLOW ATTACKS

BACKGROUND

Field

Embodiments of the present invention relate to hardening computer systems against control flow high jacking, and more specifically implementation of complementary, transparent, and strong security policies for the RTL design.

Background

The rise of embedded systems has resulted in different attack surfaces in both the hardware and software domains. Among all contemporary attacks, control-flow hijacking is a persistent threat and remains a successful attempt to compromise an insecure computing system. This subversion involves reusing current code to redirect control flow to the attacker chosen injected code execution from intended flow for variable exploits (e.g., leaking sensitive key, privilege escalation, etc.). A simplified illustration of control flow hijacking is illustrated in FIG. 1, which show an acceptable control path (a)→(c)→(d) and an impermissible (hijacked) flow path (a)→(b)→(d). Different security vulnerabilities from control flow hijacking have led to several mitigation techniques.

Control-Flow Integrity (CFI) [1] is one of the security mechanisms against many control-flow attacks (e.g., gadgets, code-reuse, code-injection, return/jump oriented programming, buffer overflow, etc.). In general, CFI hardens software attack surface by limiting the control-flow only to legitimate transitions and flags all other transfers as illegal. To derail attacker selected code, CFI provides protection except for the code which is self-modifying and generated just-in-time. CFI allows control flow for the forward edge (e.g., jump and indirect calls) and the backward edge (e.g., return). Most defenses leveraged by CFI have two phases (analysis and enforcement). During the analysis phase, a defender builds Control-Flow Graph (CFG) to approximate control flow followed by the enforcement of this CFG during execution.

Control Flow Integrity (CFI) enforcement is traditionally performed to allow the permitted execution of a control flow graph (CFG) and assumes that the hardware on which the software is executed is trusted. There exists several software- and hardware-assisted approaches to raise the bar against control-flow attacks and the success of different implementation techniques largely depends on precise control flow extraction. These CFI mechanisms provide limited security due to imprecise CFG and are of limited practicality due to large overhead.

As the construction of perfect CFG is non-trivial, the success of CFI enforcement depends largely on granularity and precision of CFG. This presents a challenge for the CFI mechanism to be applied in practice. The vast majority of current defenses, software and hardware-assisted, against control-flow attacks are reactionary and prohibitively expensive. Contemporary software-assisted countermeasures against control-flow attacks include binary rewriting during compilation, binary translation during runtime, user data verification into the program counter [1], [2], imprecise labeling [1], [3], shadow stack [1]. However, these mechanisms are per-program basis and later exploited by advanced attacks [4], [5].

As software-only approaches incur higher runtime overheads than desired, researchers have proposed hardware-assisted solutions to ensure secure control flow. One of the distinctive features of hardware supported CFI enforcement is that hardware is assumed to be trusted [6] while extending hardware features (e.g., Instruction-Set Architecture extension [7]-[9], shadow call stack [10]-[12], Instruction Set Randomization [13]) may lower performance overhead. Several researchers also utilized Last Branch Record (LBR) [14], [15], LBR+performance counters [16], hash-based message authentication codes (e.g., HMACs) [17] for CFI enforcement. However, recent exploits (e.g., return-oriented programming (ROP) attack) [4], [18] have bypassed hardware-assisted mechanisms. A summary of current CFI practices is illustrated in FIG. 2.

High-Level Synthesis (HLS) performs several behavior preserving transformations on control and dataflow graph (CDFG) and generates optimized Register Transfer Level (RTL) design (datapath and controller). Due to the distributed electronics supply chain and lack of centralized control, there is no tight security policy to protect control-flow information in RTL design.

Accordingly, described herein is a novel system and method intended to prevent unauthorized CFG execution in Register-Transfer Level (RTL) design and to facilitate enforcing both coarse-grained and fine-grained CFI protection.

BRIEF SUMMARY OF THE DISCLOSURE

Accordingly, the present invention is directed to a system and method of protecting against control-flow attacks that obviates one or more of the problems due to limitations and disadvantages of the related art.

In accordance with the purpose(s) of this invention, as embodied and broadly described herein, this invention, in one aspect, relates to A method for control flow integrity enforcement to mitigate against data execution attack in a computer operation. The method is implemented in hardware, i.e., a digital circuit. The method performed by the digital circuit includes obtaining a set of permissible state transitions for the computer operation; for each permissible state transition, compiling a signature of an incoming and an outgoing state; encoding the incoming and outgoing states to hardware logic; using the hardware logic, monitoring state transitions in execution of the computer operation; the hardware logic generating a status signal corresponding to matching the signature of the incoming and the outgoing state and checking the status signal before executing a transition.

In another aspect, the invention relates to a digital circuit for managing control flow integrity to mitigate against data execution attack in a computer operation, the digital circuit includes hardware logic comprising Boolean logic components encoding a plurality of expected state transitions logic to generate a status signal upon a match between one of the expected state transitions and a state transition to be performed in the computer operation.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

Further embodiments, features, and advantages of the system and method of protecting against control-flow attacks, as well as the structure and operation of the various embodiments of the system and method of protecting against control-flow attacks, are described in detail below with reference to the accompanying drawings.

It is to be understood that both the foregoing general description and the following detailed description are exemplary and explanatory only and are not restrictive of the invention as claimed.

BRIEF DESCRIPTION OF THE DRAWINGS

The accompanying figures, which are incorporated herein and form part of the specification, illustrate the system and method of protecting against control-flow attacks. Together with the description, the figures further serve to explain the principles of the system and method of protecting against control-flow attacks described herein and thereby enable a person skilled in the pertinent art to make and use the system and method of protecting against control-flow attacks.

FIG. 4 illustrates a threat model for purposes of discussion for implementing a monitor according to principles described herein.

FIG. 6(c) illustrates Mead & Conway's Traffic Light Controller (TLC) adjacency graph of valid and invalid transitions.

FIG. 6(d) illustrates Mead & Conway's Traffic Light Controller (TLC) controller instrumentation code section.

FIG. 9 shows Table I, states and design overhead of RTL controllers in exemplary scenarios.

FIG. 10 shows Table III, showing design attributes of an exemplary monitor according to principles described herein.

FIG. 11 shows Table II, showing design overhead of an exemplary monitor according to principles described herein.

FIGS. 12-13 illustrate implementation of an exemplary monitor according to principles described herein as applied to an exemplary instrument controller.

DETAILED DESCRIPTION

Reference will now be made in detail to embodiments of the system and method of protecting against control-flow attacks with reference to the accompanying figures The same reference numbers in different drawings may identify the same or similar elements.

Accordingly, proposed is a systematic approach for control flow integrity enforcement in the Register Transfer Level Intellectual Property (RTL IP). A goal of the present system and method is to provide performance- and security-friendly CFI policy. One aspect of performance-friendliness is the low overhead implementations described herein.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

In accordance with principles described herein, given an RTL design, states' transitions in the controller that show mutual exclusiveness of input conditions are analyzed and identify false paths are identified. Using the results of the analysis and identification of false path(s), expressions that confirm precedence relations and permissible transitions which are later included in controller description are developed. This coarse-grained transformation on controller reflects control-flow constraints are met, and it can detect any exploit during RTL execution.

To provide comprehensive prevention that extends the controller with precise intra- and inter-process behavior, a monitor verifies allowable transitions in the controller. The monitor may cover control-flow transitions against the data execution attack, such that the controller checks the status of the monitor before making any (valid or invalid) transition. This prover-verifier relationship improves the granularity CFI enforcement to finer resolution and is scalable to any RTL design.

Figure 3:
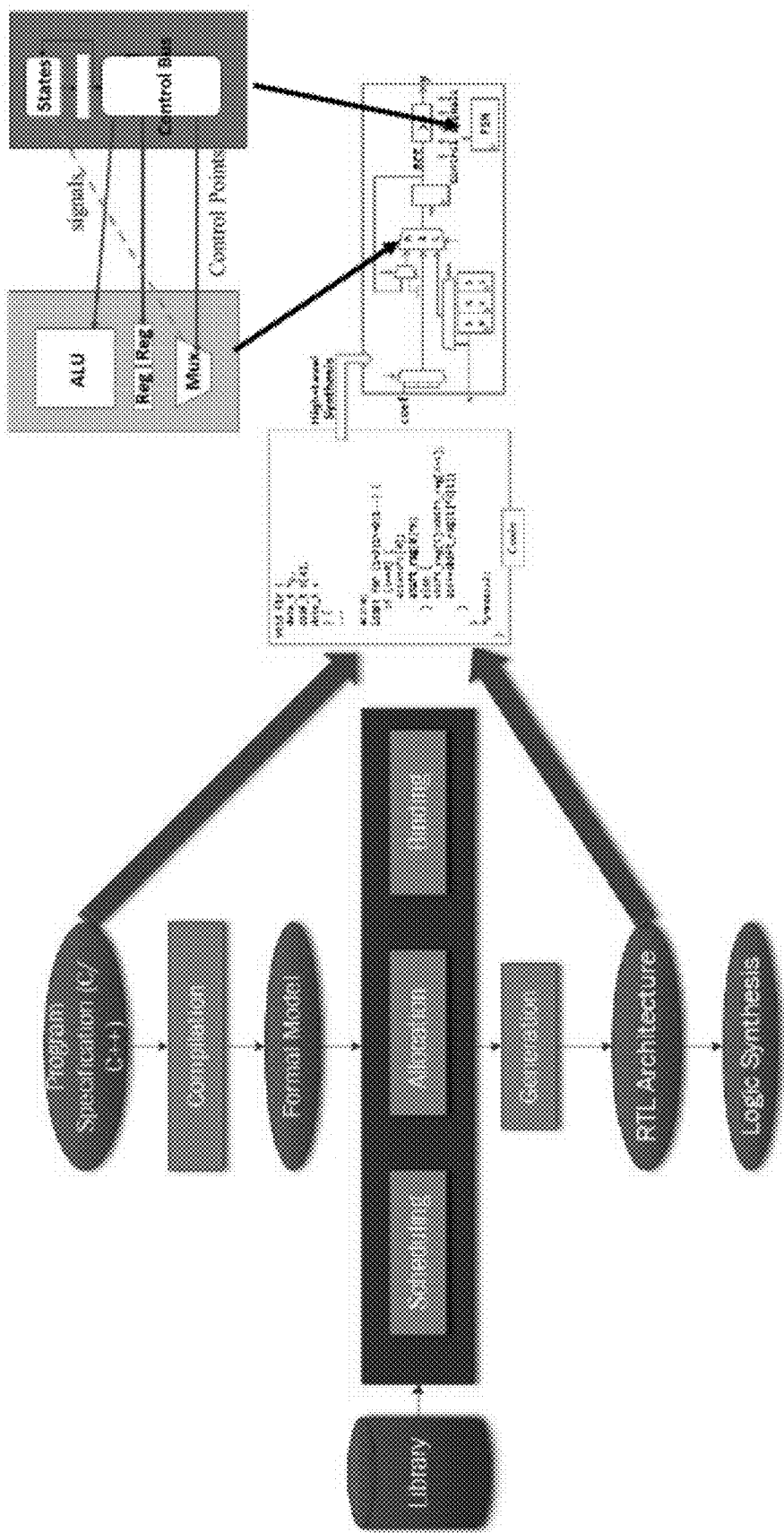
FIG. 3 illustrates components of RTL design to aid in implementation of a monitor according to principles described herein in RTL design.

Implementation in RTL design is illustrated in FIG. 3, in which a monitor for either the datapath, the controller or both is implemented to compare generated RTL architecture with a program specification.

The implementation of the present systems and method uses lightweight instrumentation in controller during coarse- and fine-grained CFI to defeat any existing and future attack(s). Similarly, the approach is compatible with existing synthesis flow, while providing a high security confidence by allowing only legitimate control-flow. This novel approach protects the fine-grained integrity of the control-flow graph associated with the controller of an RTL design at runtime.

Accordingly, in accordance with the principles describe herein, the system and method described herein provides an efficient, transparent, and scalable approach to enforcing CFG of RTL controller, lightweight controller instrumentation that can protect RTL design from contemporary and future control-flow attacks and a monitor as an additional RTL module, securely stored, which enforces the controller to follow benign CFG with no communication overhead.

Previous hardware-assisted approaches to address the vulnerabilities of control flow security assume hardware as a trust anchor in their threat model assumption. A complete summary of software-assisted security mechanisms against control-flow attacks is available in [19]. Arora et al., [10] proposed secure program execution that is application-specific. The principles described herein looked to program behavior that is somehow restrictive in the sense that a purchaser or user does not know the IP design, only the IP and its functionality, such that the system integrator relies on IPs without any modifications. He et al., [20] proposed shadow stack to guarantee backward-edge CFI, which relies on OS and leads to false positive of detection for instructions (setjmp/longjmp). Sullivan et al., [7] extended Instruction Set Architecture (ISA) and relied on OS support to examine function returns. In the case of hardware description language (HDL), this extension would be prohibitive as the existing synthesis tool may not support to generate compatible CFI-enforced RTL IP.

Davi et al., [21] proposed to incorporate a shadow call stack with new labels to the code. In the RTL controller, the labeling of the process is already in place and can bypass static mechanisms to labeling code. The same author introduced 'HAFIX' (hardware-assisted flow integrity extension) [8] that deploys new CFI instructions to store critical information. HAFIX is also based on labeling which does not enforce CFI for forward edge branch (indirect jumps and calls).

In a similar purpose, our technique is free from labeling while preventing jump to any active process in the RTL controller. Christoulakis et al., [22] described 'HCFI' (hardware enforced control flow integrity) which requires rewriting binary on modified commodity hardware (ISA extension and shadow stack).

Yuan et al., [16] proposed 'CFIGuard', a strict CFI policy, which slows down the processor speed as it checks every indirect branch for JO-bound applications.

Performance counter-based CFI enforcement (CFIMon) is proposed by Xia et al., [15] that can detect code-injection and code reuse attacks, but the technique results in a large number of false-positive and false-negative.

Das et al., [11] proposed fine-grained CFI by raising an exception in the landing pad to match the return address.

Unlike the above described hardware-assisted CFI mechanisms, the present system and method provides protection of individual RTL IP, which if subverted, can allow for compromise the whole system. By instrumenting the controller and embedding lightweight monitor without re-purposing original RTL behavior, the present system and method can be feasibly applied during design execution.

Consider an adversary who has access to High Level Synthesis (HLS) generated structural VHDL or generic RTL code as soft IP core that is heavily control-flow oriented. As an attackers' goal, an adversary has complete knowledge of program behavior and would like to subvert the control flow of the RTL controller, such as addressed in this disclosure.

FIG. 4 illustrates a threat model for purposes of discussion. In the illustrated threat model, it is assumed that there is access to the RTL IP (Heavily Control Flow Oriented). As an example, with direct access to the controller (e.g., modeled as Moore machine), an attacker can insert additional edges between states to form gadget and/or introduce new state(s) to divert controller flow to attacker chosen malicious code (e.g., to leak sensitive information). To address this attack, it may be enough to perform transitions validity check as the benign RTL controller shows a high level of deterministic transitions. Similarly, as there exists no verification on the type of user data a data path can process, an attacker can fuzz arbitrary input to conduct arbitrary state transitions in the controller (e.g., modeled as Mealy machine).

The former attack method is called a "state injection attack," while the latter is a "data injection attack," shown in FIG. 4. In both cases, the monitor according to principles described herein will act as a safety envelope. It is assumed that the RTL IPs can be subject to zero-day vulnerability, as they are normally performance-optimized and reused as module/block without being re-written over decades.

It is further assumed that before the distribution of CFI enforced RTL design, the instrumentation of data path and controller, and generation of the monitor, are securely performed with a trusted HLS tool. Thus, the generated RTL design is well-trusted where HLS configuration parameters (e.g., scheduling-allocation-binding algorithms, resource and time constraints, etc.) are unknown to the attacker. It is also assumed that the monitor is write-protected (W⊕X) and stored in secure on-chip memory, such that an adversary cannot tamper without physical access (tamper-resistant). The hardware logic in the RTL architecture may be encoded in an integrated circuit or in a programmable logic device or other hardware/firmware solution. The monitor transparently monitors program behavior without creating any additional hardware event, and it does so when any CFI violation occurs. This is a realistic assumption given the current security enforcement technique (e.g., Intel® SGX Enclave, Arm® TrustZone®, etc.).

According to principles described herein, the datapath and the controller are used to generate the hardware logic for implementing the monitor described herein. In some instances, a logic template or general framework may be provided and honed according to the actual datapath and/or controller implementation. The datapath and/or controller must follow the program specification and the hardware implemented monitor includes logic to confirm the allowable state transitions according to the program specification. Accordingly, the monitor design is customizable based on the software, but is secured in hardware logic.

The current hardware-assisted CFI enforcement technique is intended to guard the allowable control dependencies using micro-architectural features. The generated hardware design from behavioral language (C, C++, VHDL, etc.) also necessitates similar enforcement, which can be applied early-on during the design stage. As the success of CFI largely depends on precise CFG extraction, HLS can be simply used to construct precise CFG from the behavioral description which is later compiled to RTL design (datapath and controller).

Figure 1:
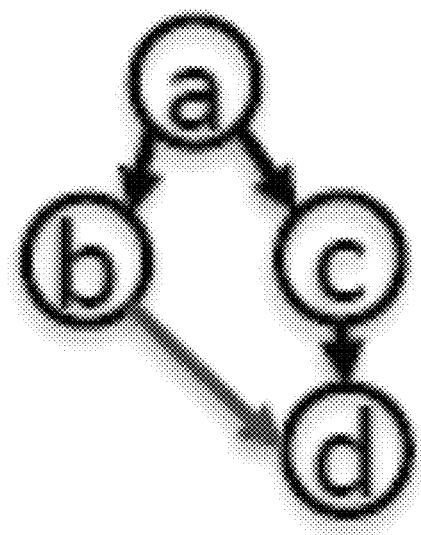
FIG. 1 is a simplified illustration of control flow hijacking.
Figure 5:
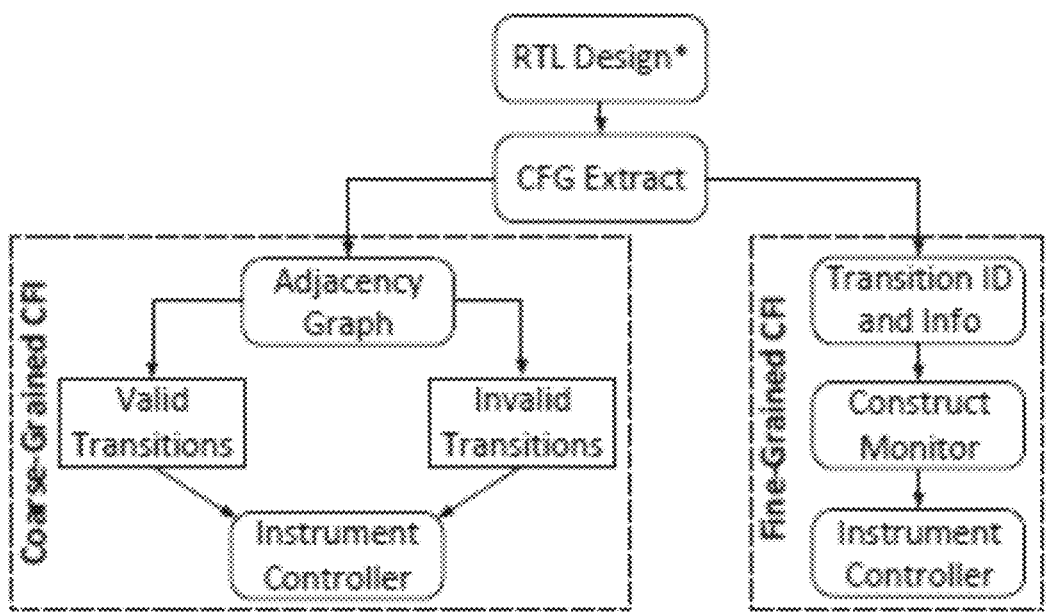
FIG. 5 shows controller instrumentation for permissible CFG transitions.
Figure 2:
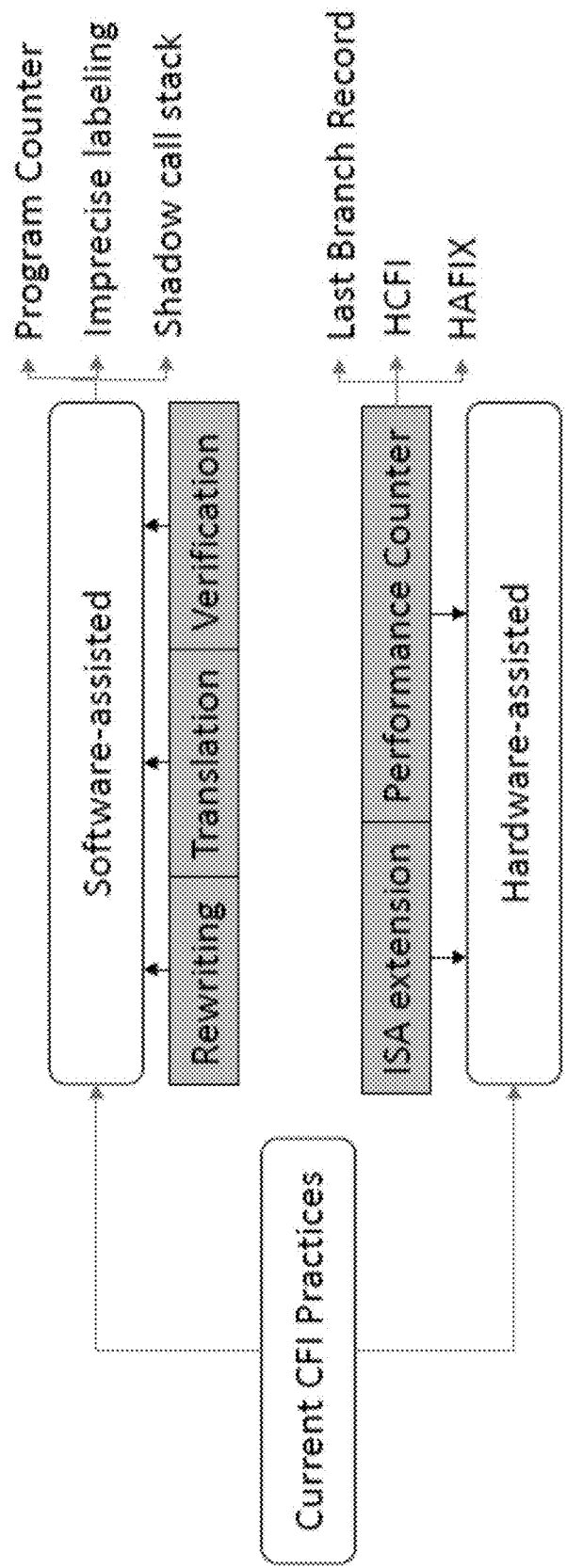
FIG. 2 shows a summary of current CFI practices.

Referring to FIG. 5, which shows controller instrumentation for permissible CFG transitions, during controller synthesis, HLS constructs state transition graph corresponding to control structures followed by state optimization. Unlike the indirect branch constructs such as indirect jump, call, function pointers, and returns that are normally exploited by an attacker for CFI violation, only forward semantics for control structure are observed (e.g., if-then-else, loop) in Hardware Description Language (HDL). Furthermore, HLS maintains initial constraints, modularity, communication, and concurrency between processes during RTL generation. This ensures the generated controller includes all possible transitions of data path behavior. Moreover, the present enforcement technique is process specific as each process is defined in complete (#state variables, start, stop/exit, wait) and represents the fine granularity of controller specification.

According to principles described herein, two orthogonal and independent CFI policies are described. A security evaluation in these two policies is provided. Both techniques target to defend a fundamental theme: "arbitrary data/code execution".

Coarse-grained CFI enforcement: A coarse-grained CFI mechanism is associated with the presently described technique that suffices to verify heavily tested state transitions or paths. It induces the simplification of enforcement. Therefore, it only covers the statically computed state transitions. In this case, reachable (unreachable) states are identified to determine valid (invalid) transitions, which implies the signature of each state variable in the RTL controller for integrity check. Such signature of the controller is generated utilizing the adjacency graph of CFG without the need for data path or any test bench. Given an RTL design, a CFG is first extracted, as shown in FIG. 5.

Then, the specification of CFG is analyzed to automatically populate an n-by-n square matrix, where n denotes the size of state variables. This matrix provides information on permissible transitions and also traces where the non-existent transitions can come from. In the present approach, the number of these metrics will be linear to the number of the process(es) the RTL design has. Such signature of valid and invalid transition may be minimized by applying Boolean theorems. By including these expressions in the controller description, checking may be performed easily, making CFI enforcement easier.

For a process within RTL design, the entry and exit state variables can be the same or different. Although the number of state variables can vary significantly, we want to confirm that transitions within a process are tightly followed. Note that, in HDL (VHDL or Verilog), the transitions are sequential within a process, while processes are concurrent. Hence, we do not need to verify any transition, which is non-existent, across processes. The status signal out of this checking is transferred via a dedicated output port which is assumed to be fault-secure.

The presently-described coarse-grained policy is different from software counterparts in that: (a) in software, coarse-grained, CFI is applied to relax the strict requirement of precise CFG at the cost of security, while we still extract precise CFG but we minimize (valid and invalid) transitions to reduce resultant hardware footprint; and (b) in software-based CFI, heuristics is normally applied which has been circumvented already by carefully crafted attacks [18], [23], while RTL controller provides deterministic transitions to catch any non-zero gadget or data execution attack.

Figure 6A:
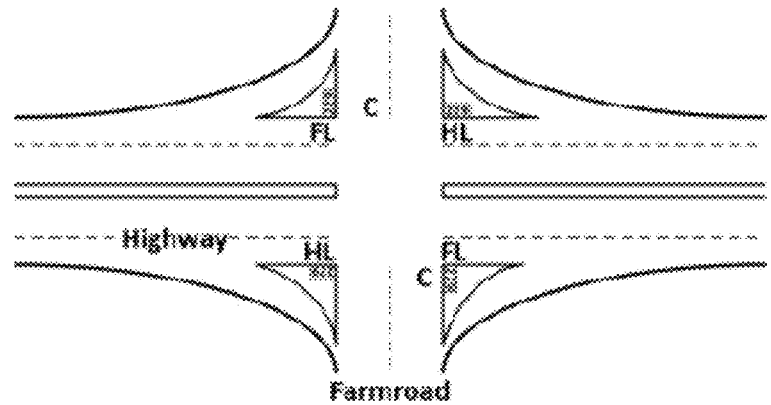
FIG. 6(a) illustrates Mead & Conway's Traffic Light Controller (TLC).
Figure 6B:
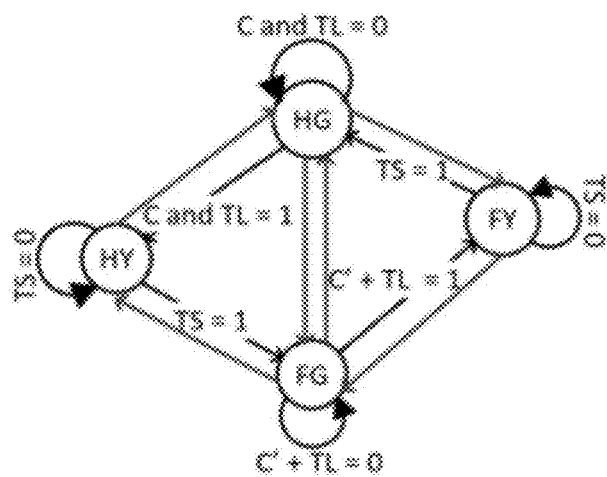
FIG. 6(b) illustrates Mead & Conway's Traffic Light Controller (TLC) state diagram with possible CFI violation shown in red.

For example, consider the classic Mead and Conway's Traffic Light Controller (TLC) [24] at an intersection of a busy highway and little-used farm road in FIG. 6(a). The state diagram is shown in FIG. 6(b) with four states (Highway Green (HG), Highway Yellow (HY), Farmroad Yellow (FY), and Farmroad Green (FG)) and three inputs (C=Car on Road, TL=Long Timer, TS=Short Timer). A long-timer is used for highway traffic and short-timer for farm road traffic. For example, if highway light is green (state=HG) and if a car arrives on the farm road, then the controller moves to state HY (highway yellow). We can deduce remaining state transitions in the same way.

Some possible attacks on TLC controller are: (a) Unsafe operation: force a transition HG→FG or FG→HG without intermediate yellow duration, leading to potentially dangerous collision conditions; (b) Denial of Service (DoS) attack: looping between FG and FY (denying green light to highway traffic). These attacks are a result of CFI violations (identified with red arrows) in FIG. 6(b). Next, '1' represents a valid transition mapped as Disjunctive Normal Form (DNF) and '0' represents invalid transition mapped as Conjunctive Normal Form (CNF) in FIG. 6(c). The input conditions that can cause invalid transitions are not shown. However, from the matrix, the designer can quickly identify transitions (valid and invalid) simultaneously under particular (and valid) input constraints and include them (with minimization) in the controller as shown in FIG. 6(d).

We can instrument original TLC behavior (lines 9-23) in Listing 1, below, with DNF and CNF expressions (lines 24-29).

```
Listing 1 Coarse-grained CFI enforcement on TLC Controller 1     entity TLC_ctrl is
2       port ( C: in bit; TL: in bit; TS: in bit;
3         ST: out bit; HL: out bit_vector (1 downto 0);
4         FL: out bit_vector (1 downto 0)
5         alarm_ctrl:
            out bit - - status of coarse-grained CFI
6         ) ;
7     end TLC_ctrl;
8     architecture TLC of TLC_ctrl is
9       tlc: process
10      begin
11        variable state: bit_vector (1 downto 0)
12        begin
13          wait on C, TL, TS;
14          if (state = "00") then -- HG
15            HL <="10"; FL <= "11";
16              if (C = '1' and TL = '1') then
17                state := "10"; ST <= '1';
18              else
19                state : = "00"; ST<= '0';
20              end if;
21            -- other states' transitions
22          end if;
23      end process tlc;
24      ccfi: process (C, TL, TS)
25      begin
26        alarm_ctrl <= DNF and ~(CNF) --
            DNF and CNF expression is from Figure 3(d)
27        assert (alarm_cntrl = '1')
28        report "CFI violation"
            severity failure; -- Abort simulation
29      end process ccfi;
30    end TLC;
```

Both DNF and CNF, together, maintain stateful CFG at the granularity of minimized expressions. Without limitation, in the present example, transitions across HG are shown. For data path in the present example a passive process is provided and defined under the entity block. It neither initializes any event nor outputs any value, thus maintains datapath behavior and is hidden from attacker notice. Indeed, it is intended to be invoked only when the assertion fails.

Fine-grained CFI enforcement: provided herein is a technique to provide CFI enforcement in a finer resolution. As we choose 'process' as a basic block implementation of the control structure, we leverage 'process' information to disallow any forbidden state and/or data execution. According to principles described herein, the fine-grained CFI enforcement is target dependent and may be platform dependent.

Figure 7:
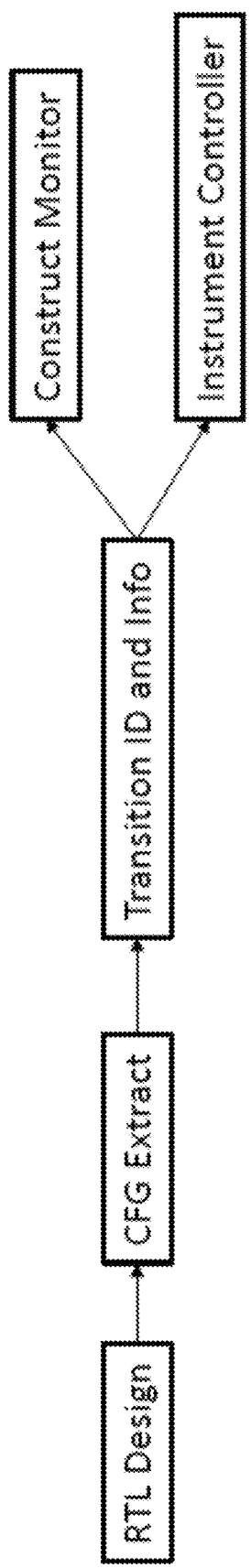
FIG. 7 illustrates steps for constructing a monitor according to principles described herein.

Referring to FIG. 7, we first extract CFG to identify process(es). Next, starting from each process, we assign a unique ID and gather information on the number of state variables and transitions. In the case of a single process of design, it is enough to store only states and transition(s) information. Analysis does not need to be performed on the value of each input (in case of Mealy machine), as their permissible values are propagated only for valid state transitions. Hence, we focus on checking process integrity by its metadata only.

Here, we assume two types of attack possibilities (intra- and inter-process) to redirect control flow. For example, during intra-process attack, an attacker wants to fall through from HG→FG or FG→HG for all input values and combinations of C, TL, and TS except when (C=1 and TL=1 and TS=1) that leads to the valid transition (HG→HY→FG). For inter-process, let us assume highway and farm road are implemented in two separate processes. The outcome of one process guides the state transition of another process. An attacker may want to insert HDL construct ('wait') in her chosen places to create an indefinite loop across one or both processes. Accordingly, the fine-grained CFI enforcement according to principles described herein provides safety-check for each transition with respect to the following safety policies:

1) The states in FSM (Moore or Mealy) cannot be altered (addition/deletion),
2) The edges between states cannot be modified, and
3) Only valid input values will be executed.

To construct 1, the number of state variables provide pre-conditions for safety transitions. Each of the variables is encoded (e.g., binary or one-hot) and compiled to generate a signature (destination, source) of its incoming and outgoing states. For example, if we use two bits to encode four states in TLC, there will be three signatures across state, HG. For incoming states, the signatures are ('0011') and ('0000') while for outgoing, it is ('0100'). The controller will provide the status (encoding) of each state to monitor (discussed next) which would be verified before generating the signature of the state by monitor. Upon receiving the signature, the state(s) will make transition(s) or halt execution for an invalid transition. As the monitor will generate a status signal only corresponding to stored signature which will be used by the controller before any transition happens, the controller (or the process) is restricted to making transitions within pre-specified state variables.

For 2, we modify edges in the source-code of the RTL controller. For Moore-type FSM, we include a status signal from the monitor in the edge between transitions. For Mealy-type FSM, we augment the input conditions with monitor status signal. When the design is executed, states within the controller only branch to the valid target(s). The status signal acts as a pre-condition that is checked before any transition happens.

For 3, we do not make any change within states or CFG edges. Instead, we insert an assertion to catch all invalid input values. This ensures the input value(s) is not modified during design execution and if overwritten, the design would generate an alarm. Although we can include all non-valid input conditions for checking within the controller in the absence of assertion, it would increase code-size and design overhead. Hence, we include safety assertion to avoid code explosion and invalid data input execution. We have shown the instrumented controller in Listing 2, below. Here, lines 3-5 denote additional input-output and lines 17-23 show new input conditions for transition.

Listing 2 Fine-grained CFI enforcement on TLC Controller

```
1     entity TLC_ctrl is
2     port (- - port def from Listing 1
3     alarm_c: in bit - - status of monitor;
4     token_m: in std_logic_vector (3 downto 0);
5     token_c: out std_logic_vector (2 downto 0);
6     end TLC_ctrl;
7
8     architecture TLC of TLC_ctrl is
9     - - signal declaration
10    tlc: process
11    begin
12      variable state: bit_vector (1 downto 0);
13      begin
14        wait on C, TL, TS;
15        if (state = "00") then - - HG
16          HL <="10"; FL <= "11";
17          token_c <= "00000"; - - HG token
18          if (C = ' 1 ' and TL = ' 1 ' and m_token
                  = "1000" and alarm_c = '0') then
19            state := "10"; ST <= '1';
```

Listing 2 Fine-grained CFI enforcement on TLC Controller

```
20          elsif (m_token
                  = "0000" and alarm_c = '0) then
21            state := "00"" ST <= '0';
22          else
23            report "CFI
                  violation" severity failure;
24          end if;
25        - - other states' transitions
26      end if;
27    end process tlc;
28    end TLC;
```

Figure 8:
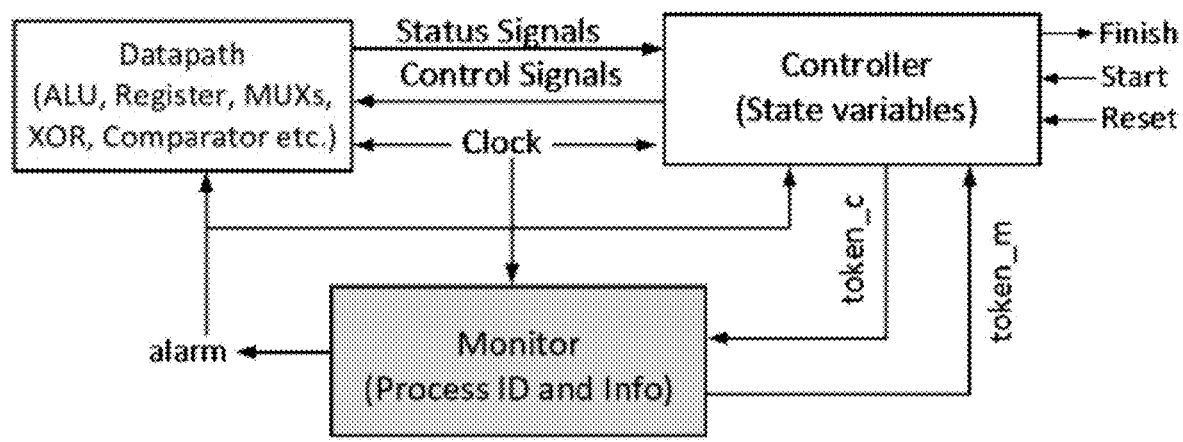
FIG. 8 illustrates high-level RTL design with an integrated monitor.

Construction of Monitor: FIG. 8 illustrates high-level RGL design with an integrated monitor. The construction of a monitor aligns with metadata information of controller and captures CFG of RTL design. FIG. 8 describes the basic key parts of the monitor. The monitor automatically verifies each transition within the controller and includes all valid transitions for which the controller generates a unique token (token_c). For each token from the controller, the monitor outputs unique token (token_m) that encodes individual transition with destination and source information. Then, the controller performs proof-search for each transition such that the received token from monitor matches with the internal token which the source node of transition generates. For example, let us assume a valid transition between HG and HY is encoded as '01' in TLC. As HG already knows its outgoing state variable (HY), it would generate a token ('0100') internally to comply with this relationship (HG→HY). Once the monitor receives the transition ID ('01'), it would discharge the transition information (destination, source) to the controller. The controller will check this transition behavior and, if it matches its internal signal, it will then jump to HY. We have shown the monitor construction of TLC in Listing 3, below. However, we did not use any hash algorithm to facilitate more unique signature from destination and source pair. Note that, use of hash engine increases hardware overhead and lead to the collision which needs to be tackled separately.

Listing 3 Monitor construction TLC Controller

```
1     entity TLC_mon is
2     port (C: in bit; TL: in bit; TS: in bit
3     alarm_m: out std_logic - - status of monitor;
4     m_token: out std_logic_vector (3 downto 0);
5     c_token: in std_logic_vector (2 downto 0);
6     end TLC_mon;
7     architecture TLC of TLC_mon is
8     - - signal declaration
9     tic: process
10    begin
11      process (c_token)
12      begin
13        case c_token is
14          when "00" => -- HG
15            if (C = '1' and TL = '1') then
16              m_token <= "1000"; -- HY, HG
17              alarm_m <= '0';
18            else
19              m_token <= "0000"; -- HY, HY
20              alarm_m <= '0';
21            end if
22          when others =>
23            alarm_m <= '1';
24        end case;
```

| | Listing 3 Monitor construction TLC Controller |
|---|---|
| 25 | end process tlc; |
| 26 | end TLC; |

The system disclosed herein may continuously check, validate, detect, and raise a flag at runtime if any violation occurs. Accordingly, attack may be thwarted in the following manner:

- The monitor ensures the integrity of the controller as it is configured to receive any transition event and thus it authenticates every transition. As we already know valid transitions from controller, only complementary (invalid) transitions need to be caught by monitor. This is handled by inserting safety assertion in monitor to act as catch-all event handler.
- An attacker can also violate the caller-callee relationship. The disclosed system may verify both caller-callee ID via a monitor that provides fine-grained CFI by enforcing forward and backward transitions. Even if an attacker transfers control (invalid wait) to the middle of the process, the victim process cannot be authenticated via a monitor, thus a flag will be raised.
- As it is assumed the monitor is immutable and has complete information on CFG of RTL design, it can detect any control (invalid state execution) or non-control (input data-driven) attack. Similarly, all transitions under each process are dispatched to the monitor. Furthermore, to ensure the monitor generates a correct response and is not compromised, the controller checks the authenticity of the response. This challenge-response scheme protects both instrumented controller and monitor.

Experimental Results: To implement our proposed technique, we have used an HLS tool, AUDI [25], that can generate synthesizable structural VHDL according to the system and method described herein for any behavioral design. We have integrated the CFI checking module on six datapath-intensive DSP designs (DCT, Decomp, Elliptic, FIR, FFT, Lattice) and one control-intensive design (TLC). We selected DSP benchmarks for two reasons. First, they exhibit different word-lengths from which correct mapping is a prerequisite for efficient CFI enforcement. Second, they contain several blocks that work in parallel and could be a possible avenue for an attacker to exploit the parallelism. Then we assess the effectiveness of the disclosed system and method in two aspects. First, we provide an overhead analysis of the coarse-grained CFI enforcement approach. Next, we evaluate the performance overhead due to the monitor. Since there is no contemporary work describing CFI of RTL design, we do not present any comparison with previous hardware-assisted CFI mechanisms.

Figure 9:
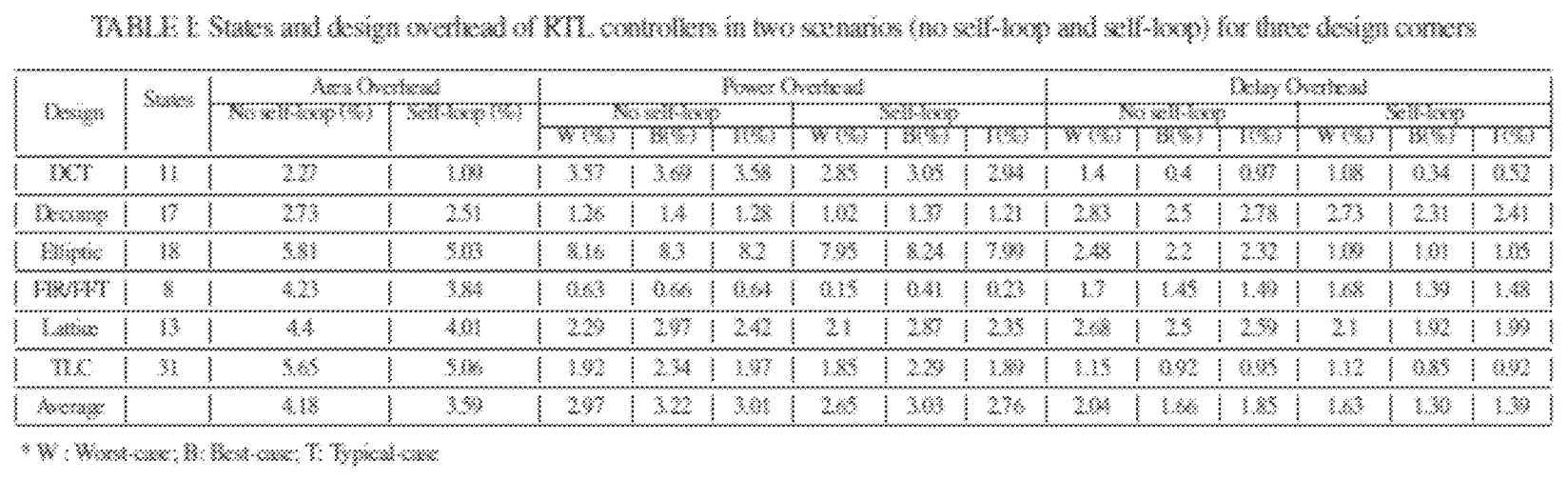

Coarse-grained CFI evaluation: In evaluating coarse-grained CFI, we have followed two scenarios. First, we do not consider any self-loop across state variables to simplify the analysis. Second, we include self-loop to minimize the generated Boolean expressions for completeness. In both scenarios, the number of states is the same which is also true for FIR and FFT. As we consider self-loop, the area overhead in Table I, shown in FIG. 9, reduces significantly from 4.18% to 3.59%. We report the corresponding power and delay overhead relative to the original design in columns 5-16 of in Table I, shown in FIG. 9, for three design corners. During the worst-case, the designs incurred an average power overhead of 2.97% and 2.65%, as compared to best- and typical-case. For best-case, the average delay overhead (1.66% for no self-loop and 1.30% for self-loop) is smaller than the worst- and typical-case.

Fine-grained CFI evaluation: We have integrated monitor with controller and datapath and evaluated the performance of instrumented RTL design. As we have carried out a functional simulation of design after embedding monitor, the designs continue to display original behavior. In the case of CFI violation, the monitor logs the event and reports the violation. However, it does not provide precise information (e.g., input data, new state or edges between states, etc.) related to attack events which we plan to explore in the future. In contrast, it reports only when any process (either in datapath or controller or both) goes astray.

In our monitor example implementation, as the number of state variables is fixed, we only report its area per design in the second column of Table III, shown in FIG. 10, and it is the same for three design corners. On the contrary, we see the design attributes (power and delay) vary, and the results are on par with the discussion made for coarse-grained CFI mechanism.

Next, when the monitor is embedded in RTL design that has an instrumented controller, the average performance overhead compared to baseline design is not greater than 5% as reported in Table II, shown in FIG. 11. Note that, for all designs, the number of processes is 1. If any other RTL design with processes more than 1 is instrumented with our technique, the number of concurrent processes within the monitor is the same as the controller. Although we expect performance overhead to be higher than a single process, CFI is strictly enforced and always-on.

Figure 12:
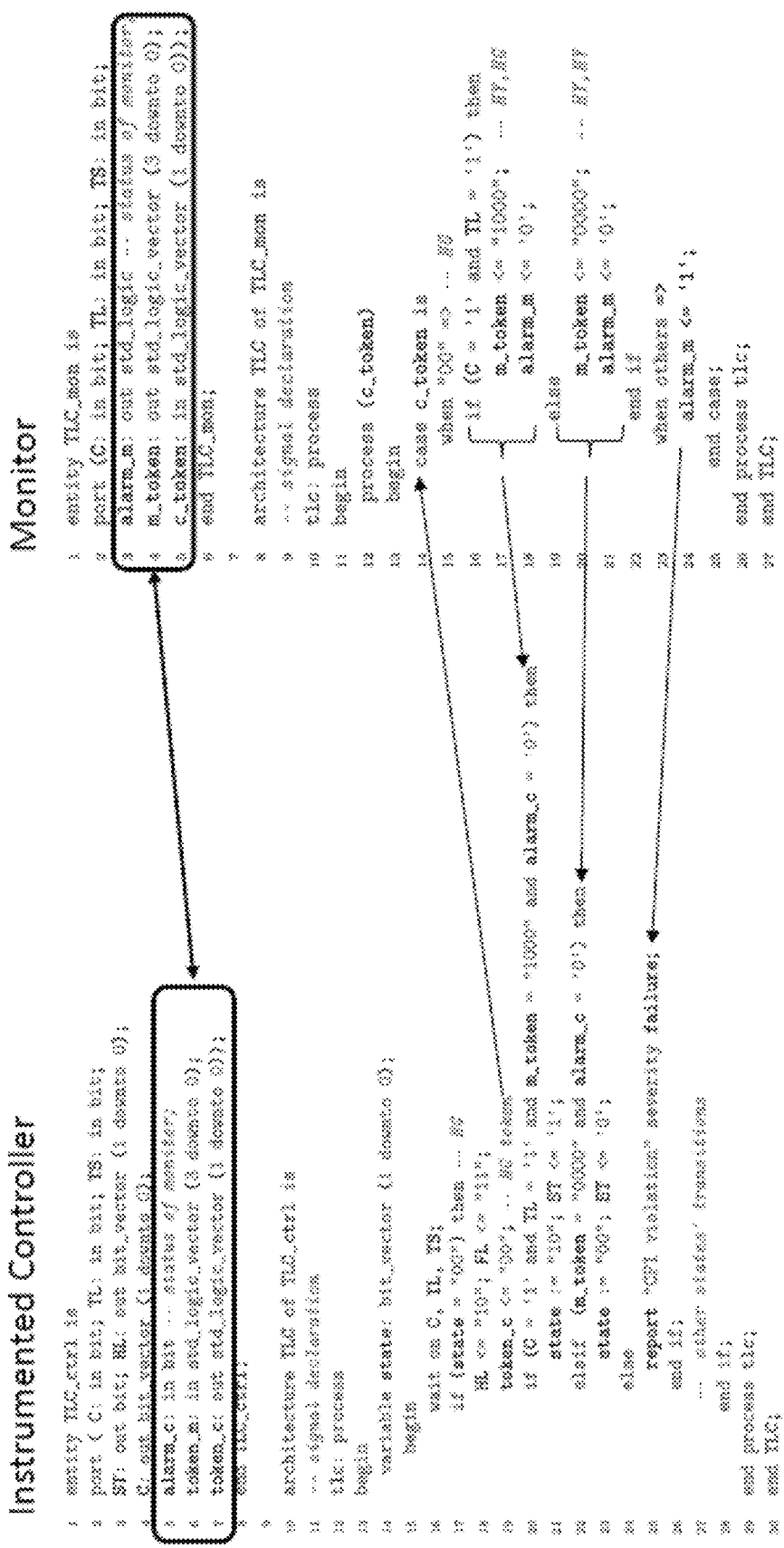

FIGS. 12-13 illustrate implementation of an exemplary monitor according to principles described herein as applied to an exemplary instrument controller. As the design starts execution, instrumented controller passes its token to monitor to point to currently executing state. Based on this token associated with state and benign transitions in/out of this state based on input value, monitor returns particular token to controller which is embedded within 'AND' clause of transition of above state. Controller checks this token and updates the state value. Further, controller alarm signal (alarm_c) accepts the value from monitor alarm signal (alarm_m) before making any transition. The value of alarm_m signal (0 in this case) refers to valid transition and this has been embedded in line 20 on instrumented controller. For invalid input value(s) influencing transition, the monitor does not have any token to pass to controller except alarm signal (line 24 in monitor implementation).

Accordingly described herein are a system and method of protecting against control-flow attacks that allows the permissible transitions in RTL design. The architecture enables designers to limit the actions an attacker can pursue to violate the integrity of program flow with minimal modifications in the design. We have proposed a technique for automatic generation of monitor and seamless integration with regular RTL and have evaluated the design for both coarse- and fine-grained CFI enforcement under several real-world designs. The present system and method of protecting against control-flow attacks has negligible performance overhead compared to unsafe RTL designs.

The coarse-grained CFI evaluation is high-level, lightweight, platform independent and hardware agnostic and implements Boolean optimization. The fine grain CFI evaluation utilizes state encoding such that design information is used to design the monitor itself. Both evaluations according to principles described herein are low overhead (<10%).

According to principles described herein, a deterministic RTL controller in which there is indirect branch. The edges between states are encoded instead of source and target state(s). Hence, we reduce the number of labels (ID) and their maintainability. Further, unlike prior solutions, there is no need to include any data structure, which can grow depending on program size and require an additional memory footprint. The proposed lightweight monitor simplifies the checking between source and target. Additionally, the approach described provides a hardware solution, which is different from protecting computer programs.

The hardware solution described herein further differs from prior Compact Control Flow Integrity and Randomization (CCFIR) solutions. CCIFR collects all legal transfers of indirect instructions statically. However, depending on input arguments, the target of such indirect instructions may change during runtime. In hardware solution described herein, the target state(s) is/are captured during state transitions; however, such information is kept secure in the monitor. According to principles described herein, given a state, all incoming and outgoing transitions, regardless of valid or invalid will be captured by the proposed monitor. That is, merely by looking into state transition and redirecting, state to undefined state(s) will be captured runtime through our monitor. Furthermore, during checking, all indirect transitions (legal or illegal) will be communicated with Springboard and the attacker can recognize this communication through cache-based attacks. The monitor will only be excited and generate an alarm for an illegal transition in our cases. The present approach protects hardware irrespective of secure or insecure software programs.

Moreover, unlike cross-module detections systems and methods for detecting and monitoring control flow transfers between software modules, the present approach invokes/generates a single module ('monitor') that captures the transactions within a process and across the processes. Prior techniques may include an the 'interception module', whereas the presently disclosed technique transparently monitors the state(s) transitions and generates the system in the event of an illegal transition.

While other techniques may avoid generating a CFG all-together, the prior approaches still protect the computer software execution, but not hardware intellectual property. No technique includes assigning a unique label to all outgoing and incoming edges from that state from a hardware perspective. In software approaches, because there could be multiple indirect control flow transfers from a single instruction, assigning and checking the tags could have additional performance penalty.

Throughout this application, various publications may have been referenced. The disclosures of these publications in their entireties are hereby incorporated by reference into this application in order to more fully describe the state of the art to which this invention pertains. The various publications are listed below.

[1] M. Abadi et al. Control-flow integrity principles, implementations, and applications. *ACM Trans. Inf Syst. Secur.*, 13(1), November 2009.
[2] J. L. Greathouse et al. Testudo: Heavyweight security analysis via statistical sampling. In IEEE/ACM International Symposium on Microarchitecture, MICRO 41, page 117-128, USA, 2008. IEEE Computer Society.
[3] C. Zhang et al. Practical control flow integrity and randomization for binary executables. In 2013 IEEE Symposium on Security and Privacy, pages 559-573, May 2013.
[4] N. Carlini and D. Wagner. Rop is still dangerous: Breaking modern defenses. In Proceedings of the 23rd USENIX Conference on Security Symposium, SEC' 14, page 385-399, USA, 2014. USENIX Association.
[5] F. Schuster et al. Counterfeit object-oriented programming: On the difficulty of preventing code reuse attacks in c++ applications. In 2015 IEEE Symposium on Security and Privacy, pages 745-762, May 2015.
[6] R. de Clercq and I. Verbauwhede. A survey of hardware-based control flow integrity (CFI). arXiv preprint arXiv: 1706.07257, 2017.
[7] D. Sullivan et al. Strategy without tactics: Policy-agnostic hardware enhanced control-flow integrity. In 2016 53nd ACM/EDAC/IEEE Design Automation Conference (DAC), pages 1-6, June 2016.
[8] L. Davi et al. Hafix: Hardware-assisted flow integrity extension. In 2015 52nd ACM/EDAC/IEEE Design Automation Conference (DAC), pages 1-6, June 2015.
[9] V. Mohan et al. Opaque Control-Flow Integrity. In NDSS, volume 26, pages 27-30, 2015.
[10] D. Arora et al. Hardware-assisted run-time monitoring for secure program execution on embedded processors. IEEE Transactions on Very Large Scale Integration (VLSI) Systems, 14(12):1295-1308, December 2006.
[11] S. Das, W. Zhang, and Y. Liu. A fine-grained control flow integrity approach against runtime memory attacks for embedded systems. IEEE TVLSI Systems, 24(11): 3193-3207, November 2016.
[12] M. Kayaalp et al. Efficiently securing systems from code reuse attacks. IEEE Transactions on Computers, 63(5):1144-1156, May 2014.
[13] R. d. Clercq et al. Sofia: Software and control flow integrity architecture. In 2016 Design, Automation Test in Europe Conference Exhibition (DATE), pages 1172-1177, March 2016.
[14] Y. Cheng et al. Ropecker: A generic and practical approach for defending against rop attacks. In Symposium on Network and Distributed System Security (NDSS), 2014.
[15] Y. Xia et al. Cfimon: Detecting violation of control flow integrity using performance counters. In IEEE/IFIP International Conference on Dependable Systems and Networks (DSN 2012), pages 1-12, June 2012.
[16] P. Yuan, Q. Zeng, and X. Ding. Hardware-assisted fine-grained code-reuse attack detection. In Proceedings of the 18th International Symposium on Research in Attacks, Intrusions, and Defenses—Volume 9404, RAID 2015, page 66-85, Berlin, Heidelberg, 2015. Springer-Verlag.
[17] A. J. Mashtizadeh et al. Ccfi: Cryptographically enforced control flow integrity. In ACM SIGSAC Conference on Computer and Communications Security, CCS '15, page 941-951, New York, NY, USA, 2015.
[18] L. Davi et al. Stitching the gadgets: On the ineffectiveness of coarse-grained control-flow integrity protection. In Proceedings of the 23rd USENIX Conference on Security Symposium, page 401-416. USENIX Association, 2014.
[19] N. Burow et al. Control-flow integrity: Precision, security, and performance. ACM Comput. Surv., 50(1), April 2017.
[20] W. He et al. No-jump-into-basic-block: Enforce basic block cfi on the fly for real-world binaries. In 2017 54th ACM/EDAC/IEEE Design Automation Conference (DAC), pages 1-6, June 2017.
[21] L. Davi, P. Koeberl, and A. Sadeghi. Hardware-assisted fine-grained control-flow integrity: Towards efficient protection of embedded systems against software exploitation. In 2014 51st ACM/EDAC/IEEE Design Automation Conference (DAC), pages 1-6, June 2014.
[22] N. Christoulakis et al. Hcfi: Hardware-enforced control-flow integrity. In ACM Conference on Data and Application Security and Privacy, CODASPY '16, page 38-49, New York, NY, USA, 2016.
[23] E. Göktas et al. Out of control: Overcoming control-flow integrity. In 2014 IEEE Symposium on Security and Privacy, pages 575-589, May 2014.
[24] C. Mead and L. Conway. Introduction to VLSI Systems. Addison-Wesley Longman Publishing Co., Inc., Boston, MA, USA, 1979.
[25] C. Gopalakrishnan and S. Katkoori. Behavioral synthesis of datapaths with low leakage power. In 2002 IEEE International Symposium on Circuits and Systems. Proceedings (Cat. No. 02CH37353), volume 4, pages IV-IV, 2002.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments but should be defined only in accordance with the following claims and their equivalents.

What is claimed is:

1. A method for control flow integrity enforcement to mitigate against data execution attack in a computer operation, the method implemented in a digital circuit, the method comprising:
    obtaining a set of permissible state transitions for the computer operation;
    for each permissible state transition, compiling a signature of an incoming and an outgoing state;
    encoding the incoming and outgoing states to hardware logic;
    using the hardware logic, monitoring state transitions in execution of the computer operation;
    the hardware logic generating a status signal corresponding to matching the signature of the incoming and the outgoing state and
    checking the status signal before executing a transition;
    wherein the encoding the incoming and outgoing states is in source-code of a register transfer layer (RTL) of a digital circuit design of the hardware logic;
    wherein the obtaining a set of permissible state transitions comprises analyzing input conditions of a controller;
    wherein the RTL layer includes a datapath and the controller; and
    wherein analyzing input conditions of the controller comprises analyzing state transitions in the controller that show mutual exclusiveness of input conditions and identifying false paths; the method further comprising:
    using results of the analyzing state transitions and identifying false paths, developing expressions to confirm precedence relations of the state transitions in the controller and permissible ones of the state transitions in the controller; and
    designing the hardware logic based on the expressions.

2. The method of claim 1, wherein the incoming and outgoing states are edge states.

3. The method of claim 1, further comprising preventing execution of a state transition in the absence of the status signal generated by the hardware logic.

4. The method of claim 1, wherein the obtaining a set of permissible state transitions comprises:
    analyzing input conditions of the datapath.

5. The method of claim 1, wherein obtaining a set of permissible state transitions for the computer operation comprises analyzing a control flow graph of the computer operation, the method further comprising:
    populating an n-by-n square matrix, where n denotes size of state variables associated with the state transitions.

6. The method of claim 1, further comprising:
    storing states and transition information for each process in the computer operation;
    providing in the hardware logic design a metadata verification to verify each transition;
    for all permissible state transitions such that the hardware logic causes generation of a first unique token and causes output of a second unique token encoding individual transition with destination and source information; and
    causing performance of a proof-search for each transition to confirm that the second unique token matches the first unique token such that the status signal is generated upon such confirmation.

7. The method of claim 1, further comprising generating a run time flag upon determining an incoming or outgoing state does not match the signature.

8. A digital circuit for control flow integrity enforcement to mitigate against data execution attack in a computer operation comprising:
    hardware logic; and
    circuitry configured to perform the steps of:
    obtaining a set of permissible state transitions for the computer operation;
    for each permissible state transition, compiling a signature of an incoming and an outgoing state;
    encoding the incoming and outgoing states to the hardware logic;
    using the hardware logic, monitoring state transitions in execution of the computer operation;
    the hardware logic generating a status signal corresponding to matching the signature of the incoming and the outgoing state and
    checking the status signal before executing a transition;
    wherein the encoding the incoming and outgoing states is in source-code of a register transfer layer (RTL) of a digital circuit design of the hardware logic;
    wherein the obtaining a set of permissible state transitions comprises analyzing input conditions of a controller;
    wherein the RTL layer includes a datapath and the controller; and
    wherein analyzing input conditions of the datapath comprises analyzing state transitions in the datapath that show mutual exclusiveness of input conditions and identifying false paths; and further comprising:
    using results of the analyzing state transitions and identifying false paths, developing expressions to confirm precedence relations of the state transitions in the datapath and permissible ones of the state transitions in the datapath; and
    designing the hardware logic based on the expressions.

9. The digital circuit of claim 8, wherein the incoming and outgoing states are edge states.

10. The digital circuit of claim 8, wherein the circuitry is further configured to perform the step of preventing execution of a state transition in the absence of the status signal generated by the hardware logic.

11. The digital circuit of claim 8, wherein the obtaining a set of permissible state transitions comprises:
   analyzing input conditions of the datapath.

12. The digital circuit of claim 8, wherein obtaining a set of permissible state transitions for the computer operation comprises analyzing a control flow graph of the computer operation, and the circuitry is further configured to perform the step of:
   populating an n-by-n square matrix, where n denotes size of state variables associated with the state transitions.

13. The digital circuit of claim 8, wherein the circuitry is further configured to perform the steps of:
   storing states and transition information for each process in the computer operation;
   providing in the hardware logic design a metadata verification to verify each transition;
   for all permissible state transitions such that the hardware logic causes generation of a first unique token and causes output of a second unique token encoding individual transition with destination and source information; and
   causing performance of a proof-search for each transition to confirm that the second unique token matches the first unique token such that the status signal is generated upon such confirmation.

14. The digital circuit of claim 8, wherein the circuitry is further configured to perform the step of generating a run time flag upon determining an incoming or outgoing state does not match the signature.

* * * * *